US010753445B2

(12) United States Patent
Arhab et al.

(10) Patent No.: US 10,753,445 B2
(45) Date of Patent: Aug. 25, 2020

(54) TORQUE TRANSMISSION ASSEMBLY FOR A MOTOR VEHICLE

(71) Applicant: VALEO EMBRAYAGES, Amiens (FR)

(72) Inventors: Rabah Arhab, Amiens (FR); Carlos Lopez-Perez, Fuenlabrada (ES); Ivan Dutier, Amiens (FR)

(73) Assignee: VALEO EMBRAYAGES, Amiens (FR)

( * ) Notice: Subject to any disclaimer, the term of this patent is extended or adjusted under 35 U.S.C. 154(b) by 17 days.

(21) Appl. No.: 15/758,992

(22) PCT Filed: Sep. 10, 2015

(86) PCT No.: PCT/FR2015/052423
§ 371 (c)(1),
(2) Date: Mar. 9, 2018

(87) PCT Pub. No.: WO2017/042440
PCT Pub. Date: Mar. 16, 2017

(65) Prior Publication Data
US 2018/0209509 A1 Jul. 26, 2018

(51) Int. Cl.
*F16H 45/02* (2006.01)
*F16F 15/121* (2006.01)

(52) U.S. Cl.
CPC ......... *F16H 45/02* (2013.01); *F16F 15/1213* (2013.01); *F16F 15/1215* (2013.01);
(Continued)

(58) Field of Classification Search
CPC .......... F16F 15/1215; F16F 2230/0064; F16H 45/02; F16H 2045/0205; F16H 2045/0221; F16H 2045/0278; F16H 15/1213
See application file for complete search history.

(56) References Cited

U.S. PATENT DOCUMENTS 9,822,862 B2 * 11/2017 Depraete ............. F16F 15/1336
9,885,406 B2 * 2/2018 Depraete ............. F16F 15/1333
(Continued)

FOREIGN PATENT DOCUMENTS

| EP | 2 600 031 A2 | 6/2013 |
| FR | 3 008 152 A1 | 1/2015 |
| WO | WO 99/41525 A1 | 8/1999 |

OTHER PUBLICATIONS

Felkaoui et al.—Rotating Machinery and Signal Processing (2019).*
International Search Report dated Apr. 7, 2016, in PCT/FR2015/052423 filed Sep. 10, 2015.

*Primary Examiner* — Tinh Dang
(74) *Attorney, Agent, or Firm* — Oblon, McClelland, Maier & Neustadt, L.L.P.

(57) ABSTRACT

A torque transmission assembly including a hydrodynamic torque convener able to be coupled to a crankshaft on the one hand, and able to be coupled to a gearbox input shaft on the other, the torque converter including a primary element and a secondary element which are rotationally mobile about an axis of rotation, and damping means including a transmission member and a bearing element, the transmission member including an elastic leaf rotating as one with the primary element or with the secondary element, and the bearing element being home by the secondary element or by the primary element respectively, the elastic leaf being capable of flexing and of transmitting a rotational torque between the primary element and the secondary clement, the flexing of the elastic leaf being accompanied by a relative rotation between the primary and secondary elements.

18 Claims, 5 Drawing Sheets

(52) U.S. Cl.
CPC ............... *F16F 2230/0064* (2013.01); *F16H 2045/0205* (2013.01); *F16H 2045/0221* (2013.01); *F16H 2045/0278* (2013.01)

(56) References Cited

U.S. PATENT DOCUMENTS

| | | | |
|---|---|---|---|
| 9,903,456 B1* | 2/2018 | Durham | F16F 15/1215 |
| 9,989,135 B2* | 6/2018 | Depraete | F16H 45/02 |
| 10,030,753 B2* | 7/2018 | Depraete | F16D 25/06 |
| 10,054,209 B2* | 8/2018 | Jeon | F16H 45/02 |
| 10,094,458 B2* | 10/2018 | Durham | F16F 15/1215 |
| 10,094,460 B1* | 10/2018 | Durham | F16H 45/02 |
| 10,100,909 B2* | 10/2018 | Durham | F16F 15/1333 |
| 10,107,372 B2* | 10/2018 | Depraete | F16H 45/02 |
| 10,113,624 B2* | 10/2018 | Yin | F16H 45/02 |
| 10,288,144 B2* | 5/2019 | Durham | F16H 45/02 |
| 2001/0032767 A1 | 10/2001 | Reinhart et al. | |
| 2015/0369296 A1* | 12/2015 | Lopez-Perez | F16F 15/121 464/77 |
| 2017/0268598 A1* | 9/2017 | Fenioux | F16F 15/1213 |
| 2017/0363194 A1* | 12/2017 | Durham | F16H 45/02 |
| 2018/0202514 A1* | 7/2018 | Yang | F16F 15/1215 |
| 2018/0283488 A1* | 10/2018 | Durham | F16F 15/1215 |
| 2019/0072165 A1* | 3/2019 | Yin | F16H 45/02 |

\* cited by examiner

TORQUE TRANSMISSION ASSEMBLY FOR A MOTOR VEHICLE

The present invention relates to a torque transmission assembly for a motor vehicle.

A transmission assembly comprises a known hydrodynamic torque converter. An example of such a torque converter is illustrated schematically and partially in FIG. 1 and makes it possible to transmit a torque from an output shaft of an internal combustion engine of a motor vehicle, such as for example a crankshaft 1, to an input shaft 2 of a gearbox.

Figure 1:
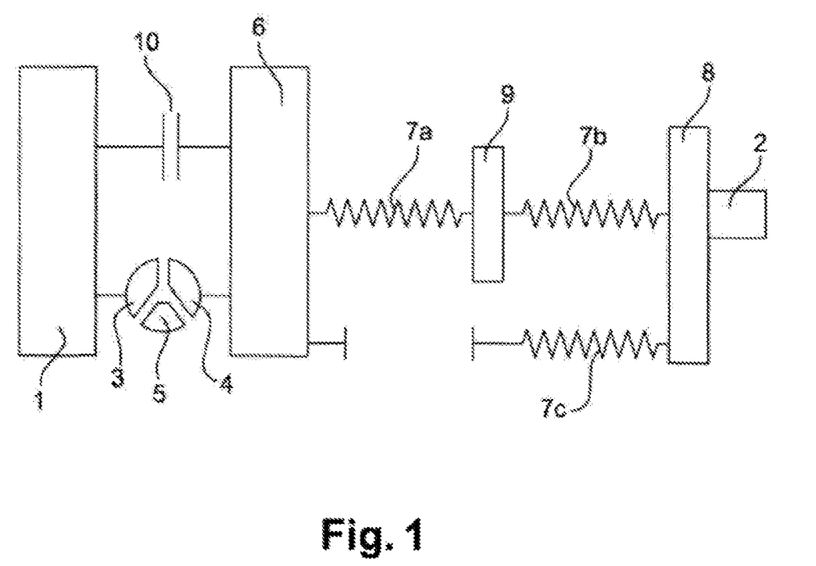
FIG. 1 is a schematic representation of a torque transmission assembly of prior art.

The torque converter classically comprises an impeller wheel 3, able to involve hydrokinetically a turbine wheel 4, through an engine 5.

The impeller wheel 3 is coupled to the crankshaft 1 and to the turbine wheel 4 is coupled to the guide rings 6.

A first group of compression spring-type elastic members 7a, 7b is amounted between the guide rings 6 and a central hub 8 coupled to the input shaft 2 of the gearbox. The elastic members 7a, 7b of the first group are arranged in a series through a phasing member 9, so that the said elastic members 7a, 7b become deformed in phase with each other, the phasing member 9 being mobile relative to the guide rings 6 and relative to the hub 8.

A second group of elastic members 7c is assembled with play between the guide rings 6 and the central hub 8, parallel with the first group of elastic members 7a, 7b, the said elastic members 7c being designed to be active over a limited angular range, in particular as angular end-of-stroke of the guide rings 6 relative to the central hub 8. The angular stroke, or the angular shift marked α, of the guide rings 6 relative to hub 8, is defined relative to a rest position (α=0) in which no torque is transmitted through the damping means formed by the aforesaid elastic members 7a, 7b.

The torque converter also comprises clutch means 10 making it possible to transmit a torque from the crankshaft 1 to the guide rings 6, in a determined operating phase, without utilizing the impeller wheel 3 or the turbine wheel 4.

The second group of elastic members 7c makes it possible to increase the rigidity of the damping means as angular end-of-stroke, i.e. for a large angular shift a of the guide rings 6 relative to the hub 8 (or conversely).

It is noted that the representation of the function M=f (α) defining the torque M transmitted through the device according to the angular shift α, comprises a first linear portion of slope Ka (for low values of angular shift α) and a second linear portion of larger slope Kb (for high values of angular shift α). Ka and Kb are the angular rigidities of the device, respectively at the start and at the end of the angular stroke. If one defines K1 to mean the accumulated rigidities of the first springs of each pair of the first group, K2 to mean the accumulated rigidities of the second springs of each pair of the first group and K3 to mean the accumulated rigidities of the springs of the second group, then Ka=(K1.K2)/(K1+K2) and Kb=Ka+K3.

The change in slope between the first and second portions of the curve can generate vibrations and a major hysteresis during the operation of the torque converter, affecting the quality of filtration obtained using the damping means.

The purpose of the invention is particularly to provide a simple, effective and economic solution to this problem.

To that end, it proposes a torque transmission assembly for a motor vehicle, the said unit comprising a hydrodynamic torque converter able to be coupled to a crankshaft on the one hand, and able to be coupled to a gearbox input shaft on the other hand, a primary element and a secondary element which are rotationally mobile relative to each other around an axis of rotation X, and damping means, characterized in that the said damping means comprise a transmission member and a bearing element, the transmission member comprising an elastic leaf rotating as one with the primary element or secondary element and the bearing element being the secondary element or the primary element respectively, the elastic leaf being able to bend and transmit a torque between the primary element and the secondary element, the flexion of the elastic leaf being accompanied by a relative rotation between the primary and secondary elements, according to the axis of rotation (X), to damp the acyclisms of rotation between the primary element and the secondary element.

Such damping means offer a progressive characteristic curve, with no change in slope. The invention thus makes it possible to reduce the vibrations generated in operation and ensures a good quality of filtration.

The leaf and the bearing element respectively form a cam follower and a cam surface arranged to cooperate with the cam follower.

The primary element can form a torque input element of the torque converter intended to be coupled to the crankshaft and the secondary element can form a torque output element of the torque converter intended to be coupled to the input shaft of the gearbox, the damping means being arranged between the torque input element and the torque output element while being designed to act in opposition to the rotation of the torque input element relative to the torque output element.

Preferably, the torque output element comprises a central hub.

The radially internal periphery of the central hub can comprise grooves able to cooperate with complementary grooves of an input shaft of a gearbox.

Preferably, the bearing element comprises at least one rolling member. The rolling member can be mounted rotating as one with the torque input element or the torque output element. Or the rolling member can be mounted floating relative to the torque input element or the torque output element.

In a first embodiment of the invention, the torque input element is formed by a turbine wheel, which is itself connected hydrokinetically to an impeller wheel, the impeller wheel being intended to be coupled to the crankshaft.

In this case, the turbine wheel, or respectively the torque output element, can be coupled to at least one annular flange surrounding the central hub, the radially internal periphery of the said flange being coupled rotationally to the said turbine wheel, or respectively to the said central hub.

The bearing element can be mounted on the radially external periphery of the flange.

The turbine wheel, or respectively the torque output element, can comprise two flanges axially delimiting between them an internal space serving as housing, at least partly, of the elastic leaf and/or the bearing element.

The impeller wheel can be is coupled rotationally to the cap in such manner as to house, at least partly, the impeller wheel, the turbine wheel, and/or the damping means.

The torque converter can comprise clutch means able to couple together rotationally the cap and the turbine wheel, in a clutched position, and able to release the cap of the turbine wheel in an unclutched position.

The clutch means can comprise an annular piston whose radially external periphery is coupled rotationally the turbine wheel, the piston being able to be coupled by friction to the cap in clutched position.

The piston can comprise a support zone, located for example radially outside, able to come to rest against the cap in clutched position, so as to effectuate a coupling rotationally by friction of the cap and the piston.

The elastic leaf can be designed so that, in a relative angular position between the turbine wheel relative to the torque output element different from a rest position, the bearing element exerts a flexion stress on the elastic leaf producing a contrary reaction force of the elastic leaf on the bearing element, that reaction force having a circumferential component tending to retract the turbine wheel and the torque output element towards the said relative rest position.

The elastic leaf can be designed so that, in a relative angular position between the turbine wheel relative to the torque output element different from a rest position, the bearing element exerts a flexion stress on the elastic leaf producing a contrary reaction force of the elastic leaf on the bearing element, that reaction force having a radial component tending to keep the elastic leaf in contact with the bearing element.

In one example, the angular displacement of the turbine wheel relative to the torque output element can be greater than 20°, preferably greater than 40°.

The elastic leaf comprises a portion of anchoring as one with the torque output element, or respectively the turbine wheel, and an elastic portion comprising a radially internal strand, a radially external strand and an arched or bent portion connecting the internal strand and the external strand.

The damping means can comprise at least two elastic leafs, each elastic leaf being as one with the torque output element, or respectively the turbine wheel, each leaf being associated with a bearing element linked to the turbine wheel, or respectively to the torque output element, each leaf being maintained elastically at rest against the said corresponding bearing element, each elastic leaf being able to bend during the rotation of the turbine wheel relative to the torque output element.

In another embodiment, the primary element can be formed by clutch means and by a cap, the clutch means being able to couple together rotationally the cap and the torque output element, in a clutched position, and able to release the cap of the torque output element in an unclutched position, the damping means being located between the clutch means and the torque output element.

The clutch means can comprise an annular piston which is coupled rotationally to the hub, the piston being able to be coupled by friction to the cap in clutched position.

As for the other embodiment, the piston can comprise a support zone, located for example radially outside, able to come to rest against the cap in clutched position, so as to effectuate a coupling rotationally by friction of the cap and the piston. Or in a second embodiment of the invention, the torque input element can be formed by clutch means. The damping means are located between the clutch means and the torque output element. These clutch means are able to couple rotationally the cap and the torque output element, in a clutched position, and able to release the cap of the torque output element in an unclutched position. The damping means are similar to those described for the first embodiment of the invention. Therefore, the torque transits from the cap towards the hub passing through the damping means.

The invention will be better understood and other details, characteristics and advantages of the invention will appear upon reading the following description made as a nonrestrictive example in reference to the appended drawings, in which.

Figure 2:
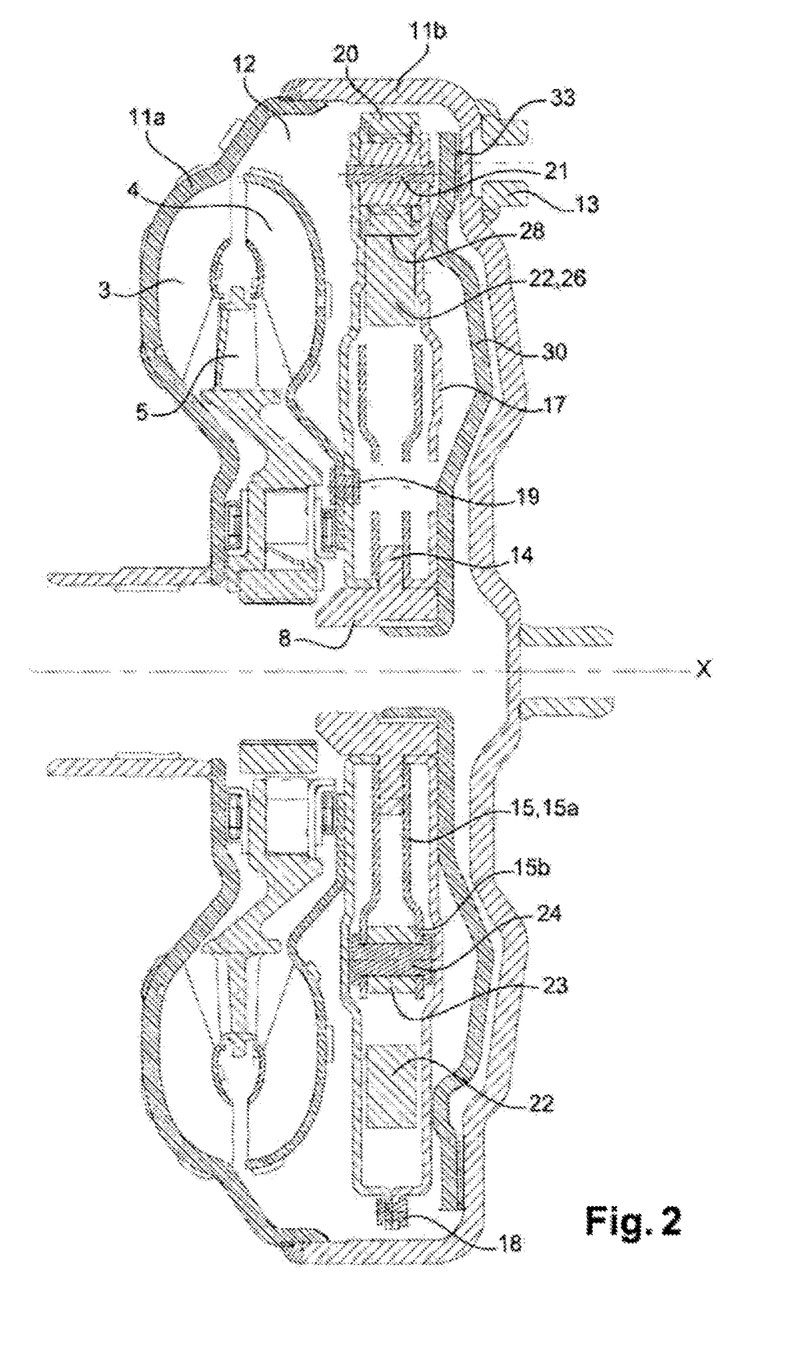
FIG. 2 is a cross section, according to a plan extending axially, of a torque transmission assembly according to a first embodiment of the invention.
Figure 3:
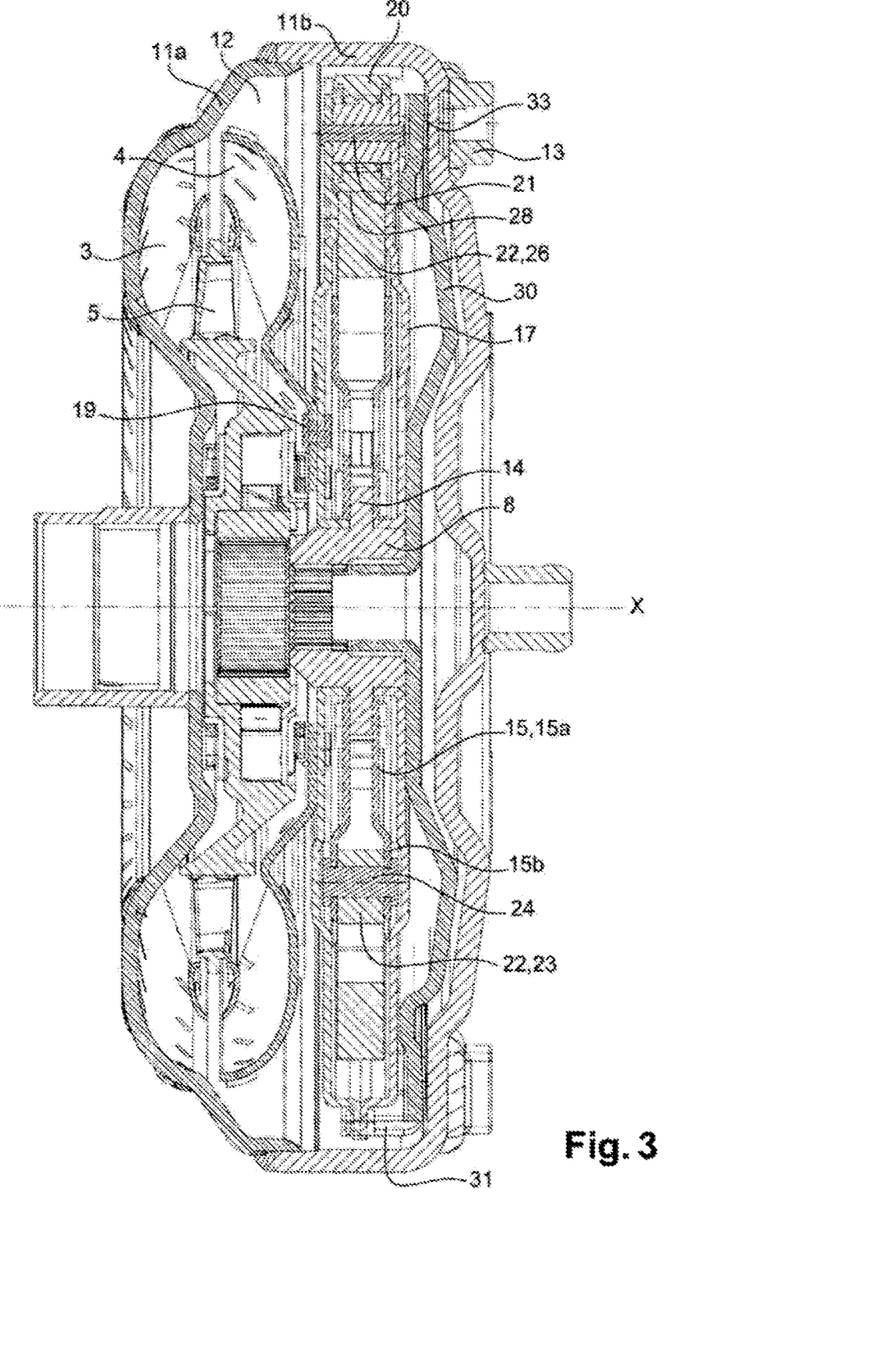
FIG. 3 is a sectional view, according to a plan axially extending, of the torque transmission assembly of FIG. 2.
Figure 4:
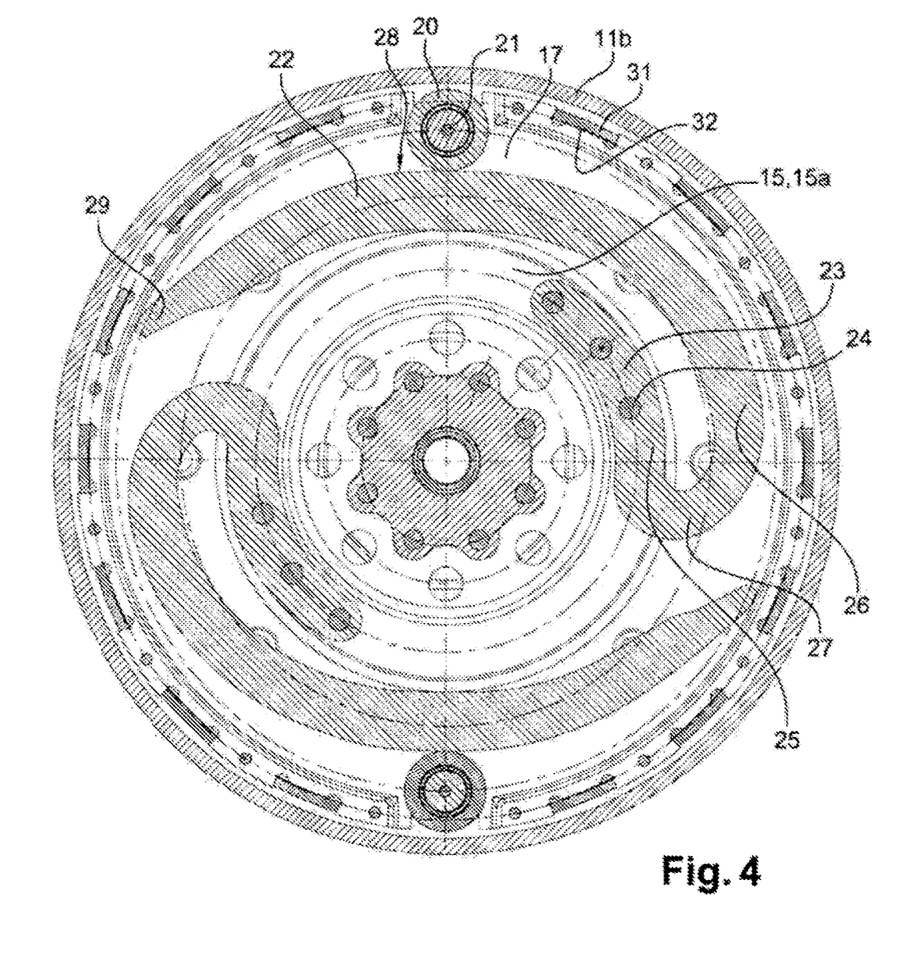
FIG. 4 is a sectional view of the torque transmission assembly of FIGS. 2 and 3, according to a radial plan perpendicular to the axis of the torque converter.

A torque transmission assembly comprising a hydrodynamic torque converter according to one embodiment of the invention is represented on FIGS. 2 to 4. This makes it possible to transmit a torque from an output shaft of an internal combustion engine of a motor vehicle, such as for example a crankshaft 1, to an input shaft 2 of a gearbox. The axis of the torque converter bears the reference X.

The torque converter comprises a paddle impeller wheel 3, able hydrokinetically to drive a paddle turbine wheel 4. In this example, the hydrokinetic drive is effectuated through a reactor 5.

The impeller wheel 3 is anchored to a bell-shaped cap 11 by welding one to the other and delimiting an internal volume 12 housing the impeller wheel 3, the turbine wheel 4 and the reactor 5. The said cap 11 comprises anchoring means 13 making it possible to couple rotationally the cap 11 to the crankshaft 1.

The torque converter further comprises a central hub 8 whose radially internal periphery is grooved, on the X axis and placed in the internal volume 12 of the cap 11. The central hub 8 comprises an annular rim 14 extending radially outward.

Two annular flanges are mounted in the said internal volume 12, the two flanges being anchored by their radially internal periphery to the rim 14 of the hub 8, through rivets or by welding, for example. The flanges extend radially and are arranged axially on both sides of the rim 14. In particular, each flange 15 comprises a radially internal portion 15a and a radially external portion 15b. The radially internal portions 15a of the two flanges 15 are axially closer to each other than the radially external portions 15b of the two flanges 15.

Two auxiliary annular flanges 17 also are mounted in the internal volume 12 of the cap 11, around the central hub 8 and are arranged axially on both sides of the flanges 15. The auxiliary flanges 17 extend radially and are anchored to each other at their radially external periphery through rivets 18.

One of the auxiliary flanges 17 is anchored through rivets 19 to the turbine wheel 4.

Two support members or rolling members 20, being in the form of cylindrical rollers or wheels, are anchored on the radially external periphery of the auxiliary flanges 17. The rolling members 20 are located in a manner diametrically opposed to each other. In particular, the rolling members 20 are mounted around axes 21 extending axially between the two auxiliary flanges 17, the said axes 21 being riveted at their ends to the auxiliary flanges 17.

Two elastic leafs 22 are mounted between the auxiliary flanges 17. Particularly, as is better visible on FIG. 4, each elastic leaf 22 comprises an anchoring portion 23 mounted between the two flanges and anchored to the latter through the rivets 24, of which there are three here, and an elastic portion comprising a radially internal strand 25, a radially external strand 26 and an arched or bent portion 27 connecting the internal strand 25 and the external strand 26. The arched or bent portion 27 has an angle of approximately 180°. In other words, the elastically deformable portion of the elastic leaf 22 comprises two areas radially shifted from each other and separated by a radial space.

The internal strand 25 develops circumferentially around the rim 14 of the central hub 8. The external strand 26 develops circumferentially on an angle ranging between 120° and 180°.

The radially external strand 26 comprises a radially external surface 28 forming a rolling track coming to rest against the corresponding rolling member 20, the said rolling member 20 being located radially outside the external strand 26 of the elastic leaf 22. The rolling track 28 has an overall convex shape. The rolling track 28 can be formed directly by a zone of the external strand 26 or by a part which is retracted onto the said external strand 26.

Between each elastic leaf 22 and the corresponding rolling member 20, the torque transmitted between the turbine wheel 4 and the central hub 8 breaks down into radial stresses and circumferential stresses. The radial stresses make it possible to bend the corresponding leaf 22 and the circumferential stresses allow the corresponding rolling member 20 to move on the rolling track 28 of the leaf 22 and to transmit the torque.

When the torque transmitted between the turbine wheel 4 and the hub 8 varies, the radial stresses being exerted between the elastic leaf 22 and the rolling member 20 vary and the flexion of the elastic leaf 22 is modified. The modification of the flexion of the leaf 22 is accompanied by a displacement of the rolling member 20 along the corresponding rolling track 28 due to circumferential stresses.

The rolling tracks 28 have profiles arranged so that, when the transmitted torque increases, the rolling members 20 each exert a flexion stress on the corresponding elastic leaf 22 causing a closening of the free distal end 29 of the elastic leaf 22 in the direction of the X axis and a relative rotation between the turbine wheel 4 and the hub 8 such that they deviate from their relative rest position. Rest position is defined as the relative position of the turbine wheel 4 relative to the hub 8 in which no torque is transmitted between them.

Therefore, the profiles of the bearing tracks 28 are such that the rolling members 20 exert flexion stresses on the elastic leafs 22 having radial components and circumferential components.

The elastic leafs 22 exert a retraction force on the rolling members 20 having a circumferential component which tends to make the rolling members 20 turn in an opposite rotation direction and therefore to retract the turbine wheel 4 and the hub 8 towards their relative rest position, and a radial component directed outward tending to keep the rolling track 28 at rest against the corresponding rolling member 20.

Preferably, when the turbine wheel 4 and the hub 8 are in their rest position, illustrated in particular in FIG. 4, the elastic leafs 22 are prestressed radially towards the X axis so as to exert a reaction force, directed radially outward, in order to keep the blades 22 at rest against the rolling members 20.

The profiles of the rolling tracks 28 can be arranged interchangeably so that the characteristic curve of transmission of the torque according to the angular displacement will be symmetrical or not relative to the rest position. According to one advantageous embodiment, the angular displacement can be larger in one rotation direction known as direct, than in an opposite rotation direction, called retro direction.

The angular displacement of the turbine wheel 4 relative to the hub 8 can be greater than 20°, preferably greater than 40°.

The elastic leafs 22 are regularly distributed around the X axis and are symmetrical relative to the X axis so as to guarantee the balance of the torque converter.

The torque converter can also comprise friction means arranged to exert a resistive torque between the turbine wheel 4 and the hub 8 at the time of their relative displacement so as to dissipate the energy accumulated in the elastic leafs 22.

The torque converter also comprises clutch means 10 able to couple together rotationally the cap 11 and the hub 8, in a clutched position, and able to release the cap 11 from the hub 8 in an unclutched position.

The clutch means 10 comprise an annular piston 30 extending radially, housed in the internal space 12 of the cap 10, whose radially external periphery has teeth 31 in the shape of cylindrical sectors, engaged in notches 32 with shapes complementary to the flanges 17. Therefore, the piston 30 is coupled rotationally to the flanges 17 and to the turbine wheel 4 and is free to move axially relative to the flanges 17, to a certain extent.

The radially external periphery of the piston 30 also comprises a support zone with friction fittings 33 and able to come to rest against part 11b of the cap 11 in clutched position so as to effectuate a coupling rotationally of the cap 11 and the piston 30.

The piston is thus movable along the X axis, between its clutched and unclutched positions, the displacement of the piston 30 being controlled by pressure chambers located on both sides of the piston 30.

Such clutch means 10 make it possible to transmit a torque from the crankshaft 1 to the input shaft 2 of the gearbox, in a determined operating phase, without involving the impeller wheel 3 or the turbine wheel 4. In this case, the torque is transmitted from the crankshaft 1, through the cap 11, the piston 30, the auxiliary flanges 17, the rolling members 20, the elastic leafs 22, the flanges 15, and the hub 8.

In the example as illustrated in FIGS. 2 and 3, the damping means are arranged relative to the turbine wheel 4 in such manner that the passage of torque is effectuated through the said damping means in "hydrokinetic" mode as well as in "clutch" mode. "Hydrokinetic" mode means the mode in which the torque is transmitted from the cap 11 to the hub 8 through the turbine wheel 4. "Clutch" mode means the mode in which the torque is transmitted from the cap 11 to the hub 8 through the piston 30. In the example, whether it be in "hydrokinetic" mode or in "clutch" mode, the torque always transits through the damping means 20, 22. Indeed, the damping means 20, 22 are coupled permanently to the turbine wheel 4 and in unclutchable fashion to the cap 11 through the piston 30.

Other embodiments not shown can be possible. In particular, the rolling members 20 can be carried by the flanges 15 while the elastic leafs can be carried by the auxiliary flanges 17.

In another example not shown, it could be devised that the damping means are arranged so that in "hydrokinetic" mode, the torque transits directly from the turbine wheel 4 towards the hub 8 without passing through the damping means, and that in "clutch" mode, the torque transits from the cap 11, towards the hub 8 passing through the piston 30 and the damping means. In this case, the turbine wheel is connected directly to the central hub 8 by a riveted connection, for example.

Figure 5:
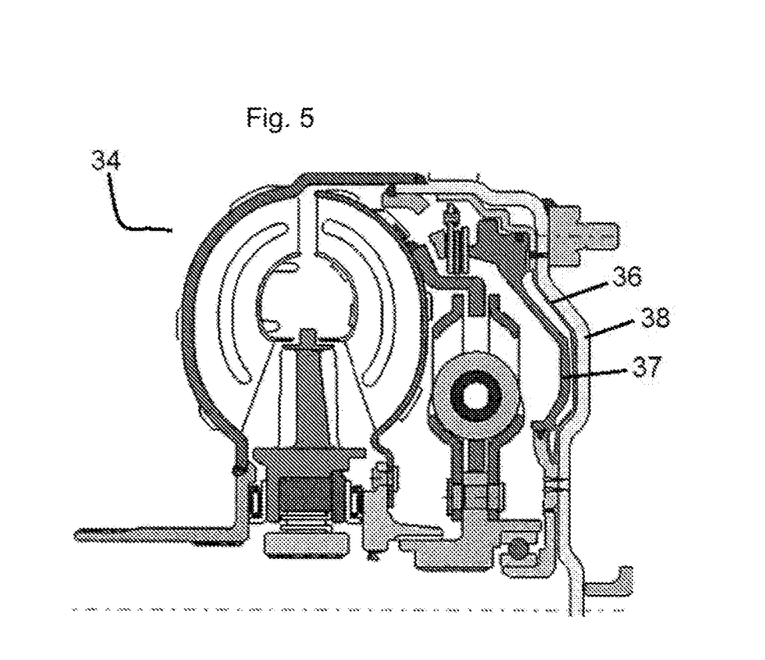
FIG. 5 is a schematic representation of a transmission assembly, according to a second embodiment of the invention.

In another example FIG. 5, instead of being interposed between the turbine wheel 4 and the hub 8, the damping means could be placed inside a chamber 36, between a piston 37 and a cap 38.

Figure 6:
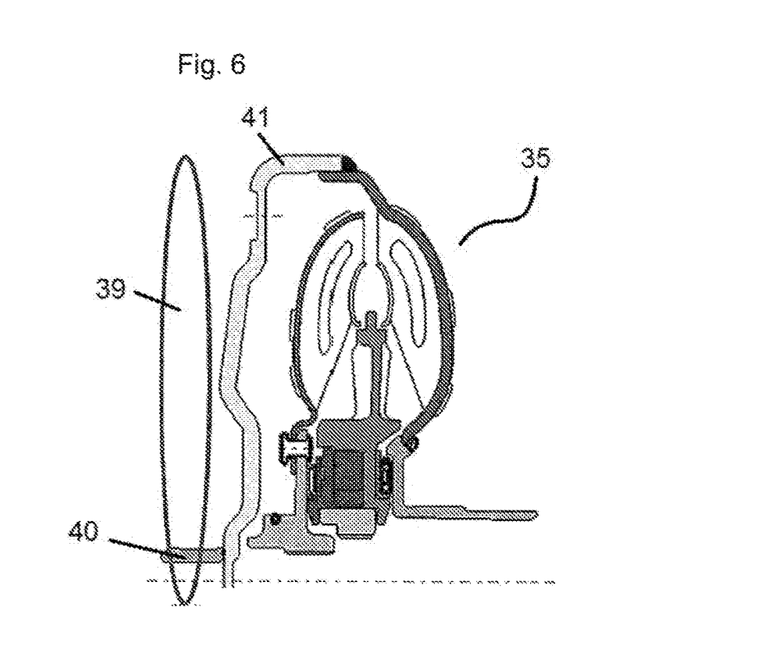
FIG. 6 is a schematic representation of a transmission assembly, according to a third embodiment of the invention.

Or else FIG. 6 illustrates another torque converter 35 in which the damping means are located in a volume 39 located outside a space delimited by a cap 41 of the converter 35.

The invention claimed is:

1. A torque transmission assembly for a motor vehicle, comprising
   a hydrodynamic torque converter able to be coupled to a crankshaft on one hand, and able to be coupled to a gearbox input shaft on the other hand,
   a primary element and a secondary element which are rotationally mobile relative to each other about an axis of rotation, and
   damping means comprising a transmission member and a bearing element, the transmission member comprising an elastic leaf rotating as one with the primary element or secondary element and the bearing element being the secondary element or the primary element respectively, the elastic leaf being able to bend and transmit a torque between the primary element and the secondary element, flexion of the elastic leaf being accompanied by a relative rotation between the primary and secondary elements, according to the axis of rotation, to damp rotation acyclisms between the primary element and the secondary element.

2. The torque transmission assembly according to claim 1, wherein the leaf and the bearing element respectively form a cam follower and a cam surface arranged to cooperate with the cam follower.

3. The torque transmission assembly according to claim 1, wherein the primary element forms a torque input element of the torque converter intended to be coupled to the crankshaft and the secondary element forms a torque output element of the torque converter intended to be coupled to the input shaft of the gearbox, the damping means being arranged between the torque input element and the torque output element all being designed to act against rotation of the torque input element relative to the torque output element.

4. The torque transmission assembly according to claim 3, wherein the torque output element comprises a central hub.

5. The torque transmission assembly according to claim 1, wherein the bearing element comprises at least one rolling member.

6. The torque transmission assembly according to claim 3, wherein the torque input element is formed by a turbine wheel which is itself connected hydrokinetically to an impeller wheel, the impeller wheel being intended to be coupled to the crankshaft.

7. The torque transmission assembly according to claim 3, wherein a turbine wheel, or respectively the torque output element, can be coupled to at least one annular flange surrounding a central hub, a radially internal periphery of said flange being coupled rotationally to the said turbine wheel, or respectively to the said central hub.

8. The torque transmission assembly according to claim 7, wherein the bearing element is mounted on the radially external periphery of the flange.

9. The torque transmission assembly according to claim 7, wherein the turbine wheel, or respectively the torque output element, comprises two flanges which axially delimit between them an internal space serving as housing, at least partly, of at least one of the elastic leaf and the bearing element.

10. The torque transmission assembly according to claim 6, wherein the impeller wheel is coupled rotationally to a cap in such manner as to house, at least partly, at least one of the impeller wheel, the turbine wheel, and the damping means.

11. The torque transmission assembly according to claim 6, wherein the torque converter comprises clutch means able to couple together rotationally a cap and the turbine wheel, in a clutched position, and able to release the cap of the turbine wheel in an unclutched position.

12. The torque transmission assembly according to claim 6, wherein the elastic leaf is designed so that, in a relative angular position between the turbine wheel relative to the torque output element different from a rest position, the bearing element exerts a flexion stress on the elastic leaf producing a contrary reaction force of the elastic leaf on the bearing element, that reaction force having a circumferential component tending to retract the turbine wheel and the torque output element toward the relative rest position.

13. The torque transmission assembly according to claim 6, wherein the elastic leaf is designed so that, in a relative angular position between the turbine wheel relative to the torque output element different from a rest position, the bearing element exerts a flexion stress on the elastic leaf producing a force of contrary reaction of the elastic leaf on the bearing element, that reaction force having a radial component tending to keep the elastic leaf in contact with the bearing element.

14. The torque transmission assembly according to claim 6, wherein angular displacement of the turbine wheel relative to the torque output element is greater than 20°.

15. The torque transmission assembly according to claim 6, wherein the elastic leaf comprises an anchoring portion joined to the torque output element, or respectively the turbine wheel, and an elastic portion comprising a radially internal strand, a radially external strand and an arched or bent portion connecting the internal strand and the external strand.

16. The torque transmission assembly according to claim 6, wherein the damping means comprise at least two elastic leafs, each elastic leaf being joined to the torque output element, or respectively the turbine wheel, each leaf being associated with a bearing element linked to the turbine wheel, or respectively to the torque output element, each leaf being maintained elastically at rest against the corresponding bearing element, each elastic leaf being able to bend during the rotation of the turbine wheel relative to the torque output element.

17. The torque transmission assembly according to claim 1, wherein the primary element is formed by clutch means and by a cap, and
   the damping means are connected to the clutch means and to a torque output element, the clutch means being able to couple together rotationally the cap and the torque output element, in a clutched position, and able to release the cap from the torque output element in an unclutched position.

18. The torque transmission assembly according to claim 6, wherein angular displacement of the turbine wheel relative to the torque output element is greater than 40°.

* * * * *